United States Patent
Mitchell

[15] 3,691,878
[45] Sept. 19, 1972

[54] METHOD FOR DAMPENING VIBRATIONS IN A ROTATING DISC AND APPARATUS THEREFOR

[72] Inventor: Wallace F. Mitchell, Arlington Heights, Ill.

[73] Assignee: Ammco Tools, Inc., North Chicago, Ill.

[22] Filed: Jan. 18, 1971

[21] Appl. No.: 107,173

[52] U.S. Cl.............................82/1 C, 82/4 A, 82/38, 82/DIG. 9, 51/237
[51] Int. Cl. ...............................................B23b 1/00
[58] Field of Search......82/DIG. 9, 1 C, 2 A, 4 A, 34, 82/38; 74/574, 490; 51/237; 310/93; 143/160 R

[56] References Cited

UNITED STATES PATENTS

| 301,185 | 7/1884 | Tyler et al. | 82/38 |
| 3,091,985 | 6/1963 | Whalen | 82/38 |
| 2,031,134 | 2/1936 | Shore | 74/574 |

Primary Examiner—Leonidas Vlachos
Attorney—Fidler, Bradley, Patnaude & Lazo

[57] ABSTRACT

A vibration dampener for inhibiting vibrations in a rotating disc includes a pair of pressure pads adjustably mounted against opposite faces of the disc at different angular positions relative to the location at which a cutting tool engages the disc.

10 Claims, 4 Drawing Figures

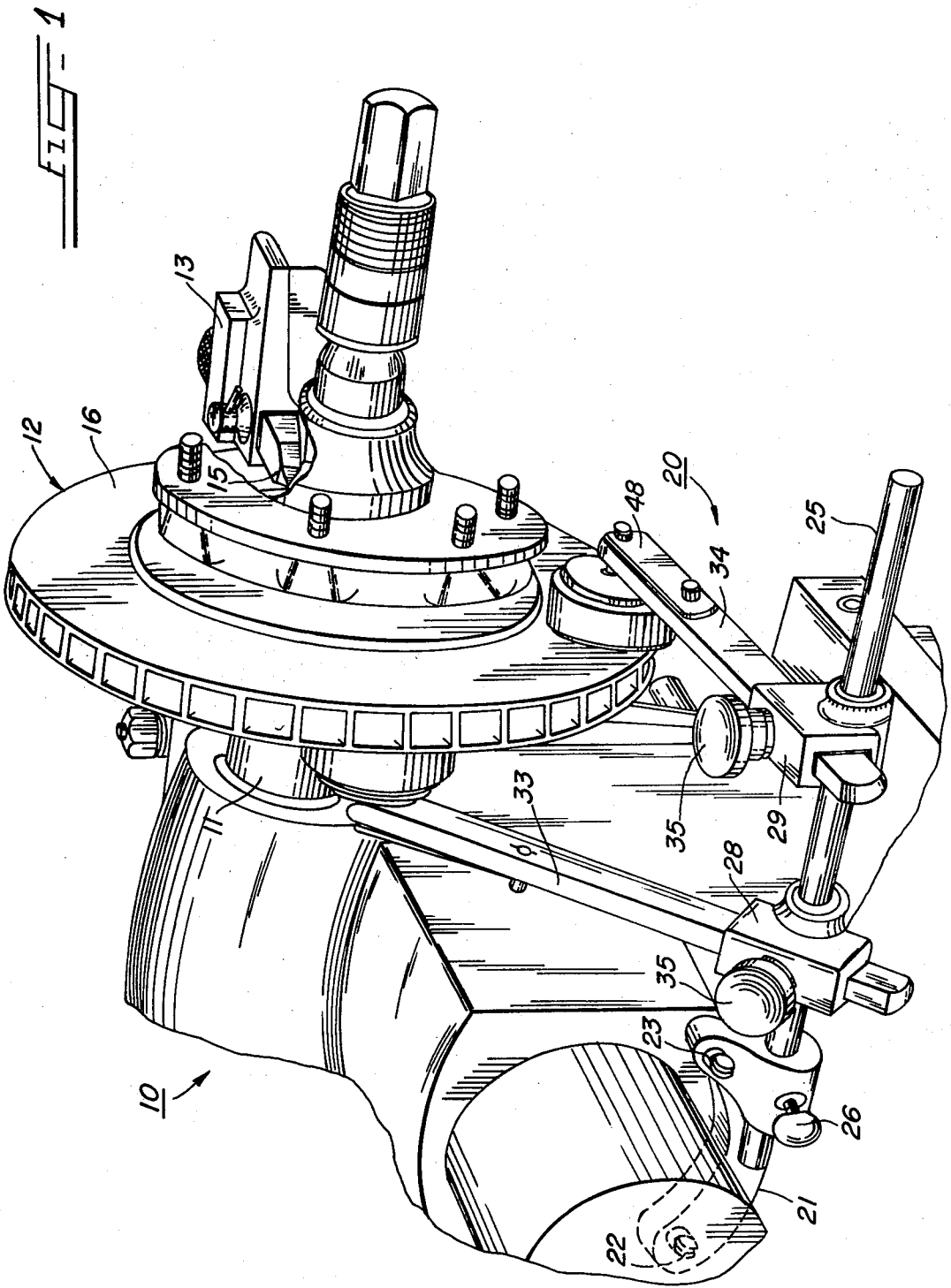

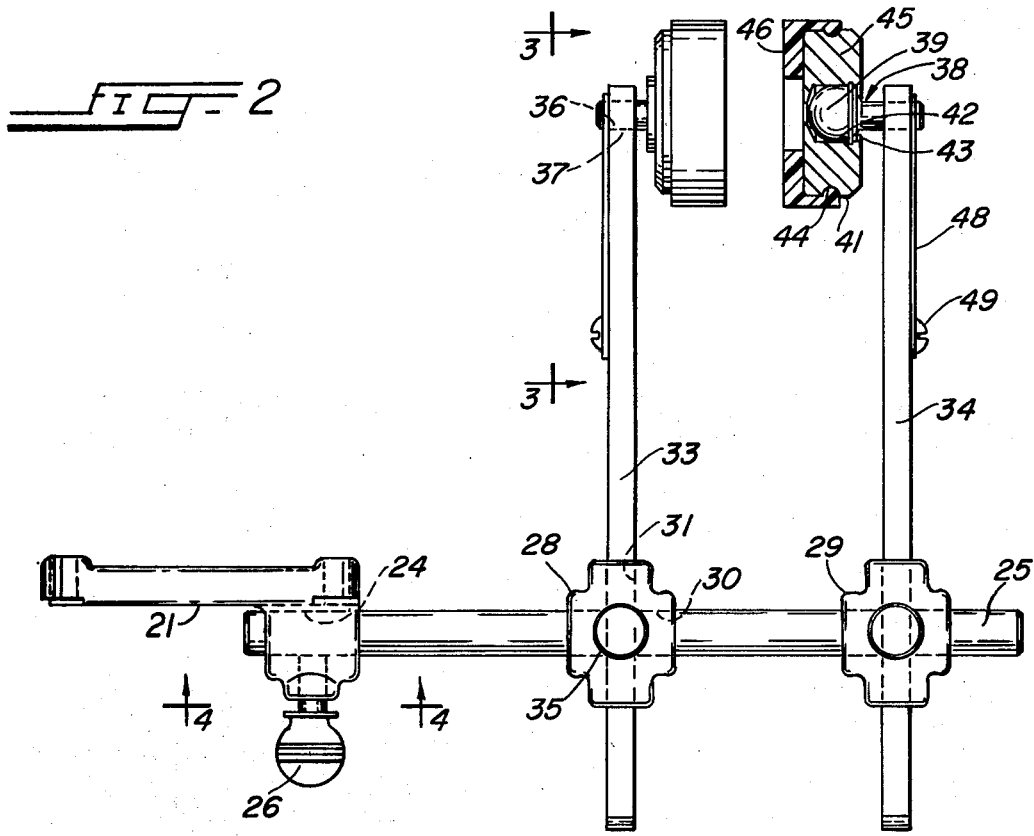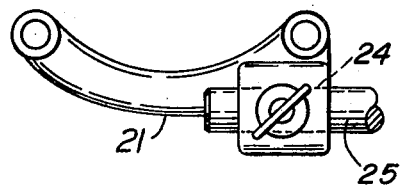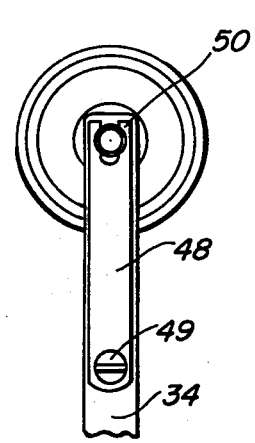
INVENTOR.
WALLACE F. MITCHELL

METHOD FOR DAMPENING VIBRATIONS IN A ROTATING DISC AND APPARATUS THEREFOR

The present invention relates to a new and improved method and apparatus for inhibiting vibrations in a rotating disc, and it relates more particularly to such a method and apparatus which is particularly suited for use with a lathe used for surfacing the faces of brake discs.

One of the most difficult operations in a machine shop is that of machining flat faces on thin discs. Unless the disc is prevented from vibrating, it is impossible to machine planar faces on the disc. In the case of brake discs, for example, where the manufacturers specify that the faces be flat to provide proper braking, the common practice to provide a reasonably flat surface has been to surface-grind a codirectional finish on the faces of the brake discs. Where relatively deep surface imperfections must be removed from the disc faces, this surface grinding follows a machining operation. It would, of course, be desirable to provide the required flat surfaces on the discs in a single machining operation thereby entirely eliminating the grinding operation and, more importantly, providing a smooth flat surface rather than one having the co-directional ground finish. Preferably, in order to provide best operation of a disc brake, it has been found that a finish of 40 micro-inches or better should be provided on the faces of the discs and the faces of the disc should be planar and parallel to within one ten thousandth of an inch.

An object of the present invention therefore is to provide a new and improved method and means for dampening vibrations in a rotating disc.

Another object of the present invention is to provide a new and improved method and apparatus for resurfacing the faces of brake discs.

A further object of the present invention is to provide an attachment for a brake disc lathe for dampening vibrations in a rotating brake disc during a metal removal operation on the faces of the disc.

Briefly, the above and further objects may be realized in accordance with the teachings of the present invention by providing a plurality of fixedly located pressure pads which lightly engage the faces of the rotating disc at a plurality of predetermined locations relative to the metal removing tool. For most discs, only two pads are necessary, and the proper locations thereof can be readily determined by lightly touching the faces of the discs to find the two most prominent antinodes, i.e., the two places where the amplitude of disc vibration feels the greatest. By using pads having disc engaging surfaces of substantial size, the pads need not be precisely located, and since the locations where the maximum amplitude of vibration occur in approximately the same places on most brake discs the pads may be easily and quickly positioned when the disc is placed in the arbor.

Further objects and advantages and a better understanding of the invention may be had by reference to the following detailed description taken in connection with the accompanying drawings, wherein:

FIG. 1 is a perspective view of a portion of a brake disc lathe embodying the present invention;

FIG. 2 is a plan view of a vibration dampener embodying certain features of the present invention;

FIG. 3 is a view of a portion of the device of FIG. 3 taken from the line 3—3; and FIG. 4 is a sectional view of the device of FIG. 2 taken along the line 4—4.

Referring now to FIG. 1 of the drawings, there is shown a portion of the lathe 10 including an arbor 11 on which a brake disc 12 is fixedly mounted so as to rotate with the spindle. A tool carrier 13 is mounted on a crossfeed drive mechanism (not shown) and carriers a pair of tool bits 15 (only one of which is shown in the drawings) for simultaneously machining the opposite faces 16 of the brake disc 12.

In order to provide smooth, flat, parallel surfaces on the opposite faces 16 of the brake disc 12, the crossfeed assembly 13 is moved inwardly by the operator so that the tips of the tools 15 respectively engage the opposite faces 16 at the inner edge of the braking face 16. With the disc 12 turning, the tools 15 are then moved into engagement with the faces 16 to make a cut of the desired depth. The crossfeed mechanism is then set into operation and moves outwardly in synchronism with the rotation disc 12 to remove a layer of metal of desired thickness from the faces 16 and to provide such faces with smooth, flat, parallel surfaces.

As is well known in the art, with the cutting tools 15 in engagement with the disc 12, standing waves develop in the disc. In order to dampen such vibration of the brake disc 12 during the machining operation, there is provided a disc silencer or vibration dampening attachment 20. The attachment 20 includes a mounting bracket 21 which is fixedly attached to the housing of the lathe 10 by means of a pair of bolts 22 and 23. A horizontal bore 24 is provided in the bracket 21 for receiving a rod 25 which is held in place in the bracket by means of a thumb screw 26 threaded in a transverse opening communicating with the hole receiving the rod 25. Mounted along the rod 25 are a pair of identical arm support members 28 and 29 each provided with a bore 30 for loosely receiving the rod 25. The support members also each include a hole 31 which is rectangular in cross section and which loosely receives one of a pair of arms 33 and 34. The holes 31 and 30 intersect so that as a screw 35 is tightened into the support the respective one of the arms 33 is forced against the rod 25 thereby to fixedly position both the rod 25 and the associated one of the arms 33 and 34 relative to the associated support member 28 or 29.

The rods 33 and 34 are also identical and therefore interchangeable and include a hole 36 near the end for receiving the shank 37 of a member 38 having a ball-shaped end 39 thereon.

A solid, metallic cylindrical pad support member 41 has a central socket 42 receiving the ball 39 which is held in place in the socket by a spring type retaining ring 43. The support 41 has an annular groove 44 in the periphery thereof for receiving an annular bead 45 on a flange portion of a removable pad 46. As shown, the pad member 46 is formed of a suitable plastic such, for example, Delrin, and snapped over the end of the member 41 whereby to be replaceable should the need arise. The face of the pad 46 is flat and smooth so as to minimize the friction between the pads and the rotating disc and to avoid marking of the face of the disc. The purpose of the pad support member 41 is to provide the necessary mass to dampen the vibrations in the disc. A support member 41 weighing about one-quarter pound has been found to perform satisfactorily.

In order to press the pad 46 against the face of the disc with a relatively small force to cause the pad to remain in contact with the disc face as it is being machined, a leaf spring 48 is attached to the arm 34 by means of a machine screw 49 and has a bifurcated upper end 50 (FIGS. 2 and 3) which fits into a suitable annular groove in the end of the stud 37.

OPERATION

In using the device of the present invention, the crossfeed assembly 13 is moved inwardly so that the tools 15 are opposite the inner radius of the fact to be turned. With the arbor 11 turning, the tools 15 are then moved into engagement with the face to provide the desired depth of cut. This sets up a standing wave pattern of vibration in the disc 12 and the operator may then place his fingers lightly on the face 16 of the disc 12 to find the location where the amplitude of vibration of the disc is the greatest (antinode). This will generally be at about 90° below the tool 15. The operator then loosens the knob 15 on the support member 29 and moves the arm 34 both angularly and axially with respect to the rod 25 to move the face of the pressure pad against the face 16 of the disc 12 at the location of the antinode. The pressure pad has a diameter approximately equal to the width of the face 16 to be resurfaced, thereby to provide a substantial area of contact between the pressure pad and the disc 12. With the disc still rotating, the operator again moves the tip of his fingers along the face 16 to find another location where the amplitude of vibration feels to be the greatest. This will generally be at a location approximately 180° from the tools 15. He then loosens the knob 35 and moves the arm 33 to position the other pressure pad against the rear face 16 of the disc 12 at the next found location. The knob 35 on the support 28 is then tightened to hold the pressure pad in the fixed, adjusted position. In making this setup, the supports 28 and 29 should be positioned along the rod 25 so as to slightly bend the leaf springs 48 so that springs will hold on the pressure pads against the faces of the disc as the surface is removed. The faces 16 of the disc are then machined in the usual manner.

Since the locations on the brake discs at which the maximum amplitudes of vibration occur are generally in the same place from one brake disc to another, it is not necessary to actually locate the antinodes for each disc. Rather, the operator will quickly learn where to locate the pads and can do so when the setup is made. Of course, should any vibration occur during machining of the disc, the arms 33 and 34 may be moved slightly to move the pressure pads to the proper positions to completely eliminate all vibration of the disc.

Using the brake disc silencer attachment 20 of the present invention, surfaces having a thirty micro-inch finish and flat and parallel to better than 0.0001-inch have been simultaneously machined on both faces of conventional brake discs, thereby eliminating the need to surface grind these faces as was required with the prior art. Moreover, two pressure pads 46 have been sufficient to eliminate vibration in all of the different type brake discs encountered to date.

While the present invention has been described in connection with particular embodiments thereof, it will be understood that many changes and modifications may be made without departing from the true spirit and the scope of the present invention. It is intended, therefore, to cover all such changes and modifications in the appended claims.

What is claimed is:

1. A method of dampening vibrations in a rotating disc, comprising the steps of
    placing a first member against one face of said disc at the location where the amplitude of vibration is the greatest, and
    placing a second member against the other face of said disc at the location where the amplitude of vibration is the greatest with said first member engaging said one face.

2. A method according to claim 1 wherein
    said first and second members are pads.

3. A method of removing metal from the face of a rotating disc, comprising the steps of
    placing a first member against a face of said disc,
    placing a second member against a face of said disc at a location displaced from said first member by approximately 90°, and
    applying a cutting tool against one of the faces of said disc at a location displaced approximately 90° from said first member and approximately 180° from said second member.

4. Apparatus for dampening vibrations in a rotating disc, comprising
    a fixed support,
    a first arm pivotally adjustable on said support in a plane parallel to the plane of said disc,
    a second arm pivotally adjustable on said support in a plane parallel to the plane of said disc,
    a first pressure pad mounted on said first arm and including a planar face for engagement with a face of said disc,
    a second pressure pad mounted on said second arm and including a planar face for engagement with a face of said disc.

5. Apparatus according to claim 4 wherein
    said support comprises a guide extending parallel to the axis of rotation of said disc, and
    said arms are adjustably and independently movable in an axial direction along said guide to position said pads against said disc.

6. Apparatus according to claim 4 wherein said pressure pads each comprise
    a circular plastic member having said planar, disc engaging face.

7. Apparatus according to claim 4 comprising
    a universal type coupling connected between each of said pressure pads and said arms to permit self-aligning of said pads against said disc.

8. Apparatus according to claim 4 comprising
    spring means mounted between said pads and said arms for resiliently biasing said pads against said disc.

9. Apparatus according to claim 4 wherein
    said support includes a rod extending parallel to the axis of rotation of said disc,
    a pair of arm supporting members each having a first hole through which said rod loosely extends and a transverse hole partially intersecting said first hole and through which one of said arms extends, and
    manually adjustable means for urging said arms against said rod to hold said arms in fixed axially adjusted positions in said members and to hold said members in fixed axially adjusted positions along said rod.

10. Apparatus according to claim 4, each of said pressure pads comprising a generally cylindrical, solid, metallic member having a circumferential groove therein, and a plastic cap member having a flat, circular disc engaging portion and an annular flange extending over the periphery of said cylindrical member, said flange having a re-entrant, annular bead disposed in said groove for removably holding said cap member on said cylindrical member.

* * * * *